United States Patent
Zheng et al.

(10) Patent No.: US 7,382,794 B1
(45) Date of Patent: Jun. 3, 2008

(54) PARALLEL ROUND-ROBIN ARBITER SYSTEM AND METHOD

(75) Inventors: Si Qing Zheng, Plano, TX (US); Mei Yang, Richardson, TX (US); John Blanton, Dallas, TX (US); Prasad Golla, Plano, TX (US); Dominique Verchere, Breuillet (FR)

(73) Assignee: Alcatel Lucent, Paris (FR)

( * ) Notice: Subject to any disclaimer, the term of this patent is extended or adjusted under 35 U.S.C. 154(b) by 884 days.

(21) Appl. No.: 10/626,424

(22) Filed: Jul. 24, 2003

(51) Int. Cl.
*H04L 12/28* (2006.01)
(52) U.S. Cl. ..................... 370/412; 370/406
(58) Field of Classification Search .............. None
See application file for complete search history.

(56) References Cited

U.S. PATENT DOCUMENTS

| | | | | |
|---|---|---|---|---|
| 3,582,789 A | * | 6/1971 | Mick | 375/359 |
| 5,301,333 A | * | 4/1994 | Lee | 710/244 |
| 2002/0176431 A1 | * | 11/2002 | Golla et al. | 370/412 |

OTHER PUBLICATIONS

S.Q. Zheng, Mei Yang, J. Blanton, P. Golla and D. Verchere; "A simple and fast parallel round-robin arbiter for high-speed switch control and scheduling"; Proc. of the 45th IEEE International Midwest Symposium on Circuits and Systems, Aug. 2002.

P. Gupta and N. McKeown; "Designing and Implementing a Fast Crossbar Scheduler"; IEEE Microelectronics, vol. 19, No. 1, pp. 20-29, 1999.

* cited by examiner

*Primary Examiner*—Robert W. Wilson (57) ABSTRACT

A Parallel Round-Robin Arbiter (PRRA) system and method for arbitrating among N requesters. A plurality of leaf nodes that correspond to the N requesters form a directed ring of a hierarchical decision tree, wherein the leaf nodes are operable to propagate requests from the requesters. Each leaf node is provided with status logic operable to transmit its priority status for resolution of requests by the decision tree. Logic associated with the decision tree's nodes is operable to hierarchically resolve the requests propagated by the leaf nodes, wherein each leaf node is operable to transmit its grant to one of its immediate leaf node neighbors coupled to it via the directed ring for influencing the neighboring leaf node's priority status logic.

24 Claims, 7 Drawing Sheets

PARALLEL ROUND-ROBIN ARBITER SYSTEM AND METHOD

BACKGROUND OF THE INVENTION

1. Technical Field of the Invention

The present invention generally relates to arbitration techniques. More particularly, and not by way of any limitation, the present invention is directed to a Parallel Round-Robin Arbiter (PRRA) system and method for arbitrating among a plurality of requesters.

2. Description of Related Art

Arbitration is a widely used technique for resolving contention among a plurality of entities that generate simultaneous requests with respect to one or more common resources. For example, in a crossbar switch application where multiple data input queues need to be switched to a number of output ports, an arbitration scheme is typically employed for deciding how the input data is to be scheduled through a switching fabric disposed between the inputs and the outputs. As a basic building block of a scheduler, accordingly, design of a fast and fair arbiter is critical to the efficiency of the scheduling process, which is the key to the performance of a high-speed switching apparatus.

Known hardware-based arbiter designs involve a Round-Robin arbitration (RRA) methodology where the basic components of some of the designs comprise various circuit blocks such as encoders, multiplexers, barrel shifters, carry-look-ahead circuits, and the like. Although these designs may be adequate in some applications, they are nevertheless afflicted with certain deficiencies. For example, the conventional hardware RRA designs have a rather formidable AT complexity (the product of time and chip area), that is, the designs involve longer arbitration times while taking up an inordinate amount of circuitry.

SUMMARY OF THE INVENTION

Accordingly, the present invention advantageously provides a Parallel Round-Robin Arbiter (PRRA) system and method for arbitrating among N requesters that addresses these and other shortcomings and deficiencies. In one aspect, the present invention is directed to a PRRA system that includes a plurality of leaf nodes corresponding to the N requesters which form a directed ring of a hierarchical decision tree of the arbiter system, wherein the leaf nodes are operable to propagate requests from the requesters. Each leaf node is provided with status logic operable to transmit its priority status for resolution of requests by the decision tree. Logic associated with the decision tree's nodes is operable to hierarchically resolve the requests propagated by the leaf nodes, wherein each leaf node is operable to transmit its grant to one of its immediate leaf node neighbors coupled to it via the directed ring for influencing the neighboring leaf node's priority status logic. By way of implementation, an exemplary embodiment of the present invention includes a complete binary decision tree, with $N=2^n$ for some $n>1$.

In another aspect, the present invention is directed to a crossbar switch apparatus for switching a plurality of input queues to at least one output. A directed ring forms a leaf node level for receiving requests generated by the plurality of input queues. A decision tree logic associated with the directed ring is operable to hierarchically resolve which input queue's request with respect to the at least one output should be granted. Each leaf node includes logic means for influencing its neighboring leaf node's state if the leaf node receives a Grant signal responsive to a request generated by a corresponding input queue.

In yet another aspect, the present invention is directed to an arbitration method for resolving contention among a plurality of requesting entities with respect to at least one common resource. The method commences with the operation of receiving requests generated by the plurality of requesters, the requests being propagated by a plurality of leaf nodes corresponding to the plurality of requesters, wherein each leaf node is operable to transmit a control signal (e.g., a Head signal) indicative of its priority status. The arbitration method then proceeds to the operation of hierarchically resolving which requester's request with respect to the at least one common resource should be granted. Thereafter, a leaf node that receives a Grant signal upon arbitration generates a control signal based at least in part upon the Grant signal for transmission to its neighboring leaf node for affecting the neighboring leaf node's priority status.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
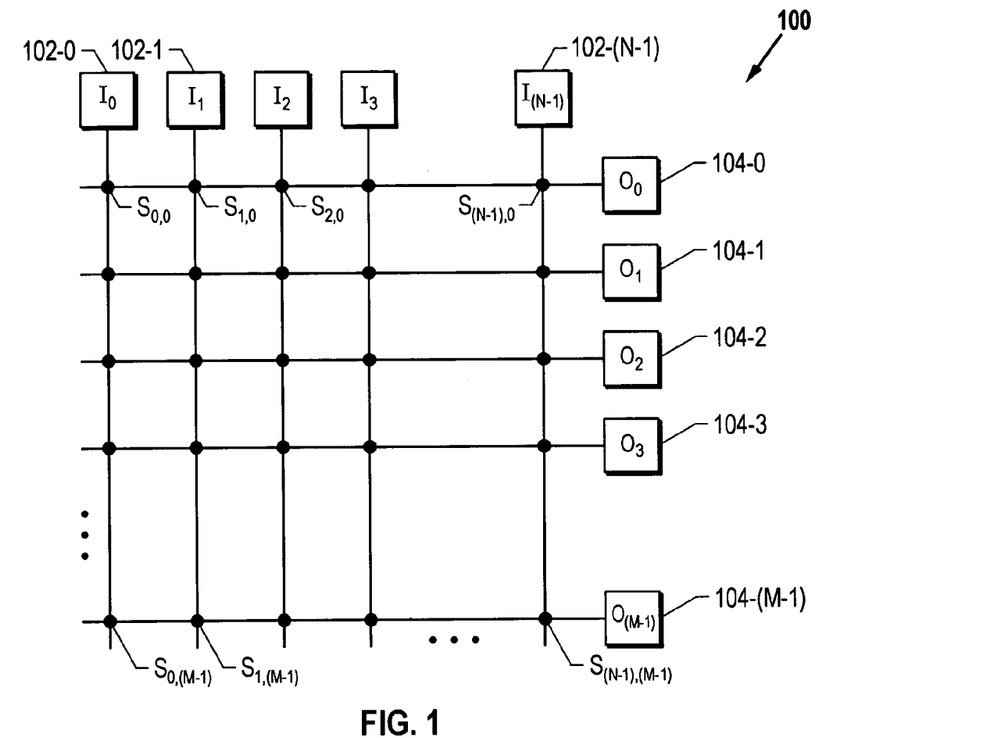
FIG. 1 depicts an exemplary crossbar switch element disposed between N inputs and M outputs wherein a Parallel Round-Robin Arbiter (PRRA) embodiment of the present invention may be advantageously implemented.

In the drawings, like or similar elements are designated with identical reference numerals throughout the several views thereof, and the various elements depicted are not necessarily drawn to scale. Referring now in particular to FIG. 1, depicted therein is an exemplary crossbar switch element 100 disposed between N inputs and M outputs wherein a Parallel Round-Robin Arbiter (PRRA) embodiment of the present invention may be advantageously implemented. At the outset, it should be recognized that the switch element 100 may generically exemplify a switching apparatus operable in any number of applications where a number of competing entities generate requests with respect to accessing one or more common resources. Accordingly, the N inputs 102-0 through 102(N-1) may be treated as requesters, regardless of whether they comprise data input queues to be switched via a switching matrix using a scheduler, a number of processors attempting to access one or more memory modules, or a plurality of circuits (e.g., bus drivers) requesting control of a common bus, and the like. Where there are multiple common resources, i.e., M outputs 104-0 through 104-(M-1), each of the requesters is operable to be coupled to each output via a switching unit, thereby giving rise to an [M×N] matrix of switching units, i.e., a crossbar. For instance, with respect to FIG. 1, $S_{0,0}$ is representative of a switching unit operable to couple $I_0$ 102-0 to $O_0$ 104-0 provided the request by $I_0$ 102-0 is granted, $S_{1,0}$ is representative of a switching unit operable to couple $I_1$ 102-1 to $O_0$ 104-0 provided the request by $I_1$ 102-1 is granted, and so on. As will be shown in detail hereinbelow, a simple yet fast PRRA scheme provided in accordance with the teachings of the present invention may be implemented for arbitrating and resolving among the N requesters with a degree of fairness as well as low latency.

Figure 2:
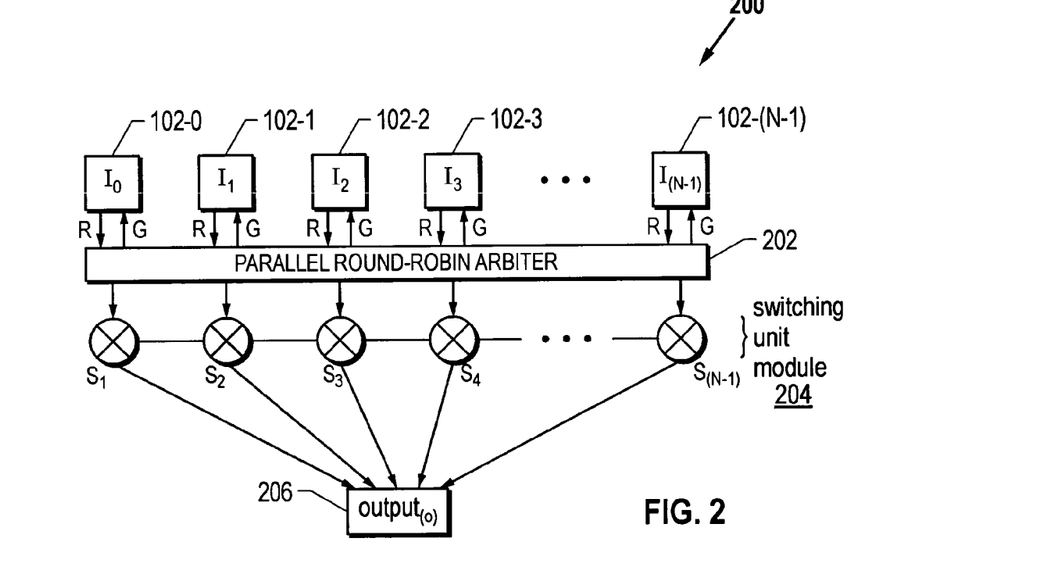
FIG. 2 depicts a portion of the crossbar switch element shown in FIG. 1 for illustrating a plurality of requests directed toward a common output that are resolved by an embodiment of the present invention.

Without loss of generality, FIG. 2 depicts a row portion 200 of the crossbar switch element shown in FIG. 1 for illustrating a PRRA scheme according to an embodiment of the present invention for resolving a plurality of requests directed toward a common resource, identified herein as Output$_{[o]}$ 206. Each of the N requesters 102-0 through 102-(N-1) is operable to generate a request "R" that is received by a PRRA 202, which is coupled to a switching unit module 204 comprised of N switching units corresponding to the N requesters. Upon successful resolution of the multiple requests via an arbitration process described in detail in the following sections, the PRRA 202 is operable to generate a grant message "G" towards a winning requester. Further, in response to the arbitration result, a control message may be generated towards the switching element associated with the winning requester, whereby an access pathway between the winning requester and the common resource 206 is established.

In accordance with the teachings of the present invention, the PRRA scheme is provided as a hierarchical decision tree having $[(\log_{Base}N)+1]$ levels, where N=[Base]$^n$ for some n>1, wherein each of the N requesters is coupled to a leaf node (l-node) that is assigned a priority value, which could be either fixed or determined via a dynamic priority assignment procedure. Each leaf node is coupled to one of its next neighbor nodes (i.e., either its left leaf node or its right leaf node), thereby forming a directed ring that becomes the leaf level in the hierarchical decision tree.

In addition to the N leaf nodes on the leaf level, the hierarchical decision tree includes another plurality of nodes organized in a subtree of [K-1] levels, wherein K=[(log$_{Base}$N)+1]. At the apex of the tree, a root level (or, level 0) includes a single root node (r-node). The remaining [K-2] levels are denoted as intermediary levels, each including a sub-plurality of internal nodes [Base]$^i$, where i=1, 2, ... , [(log$_{Base}$N)-1], which may be designated as i-nodes.

As will be set forth in greater detail below, each leaf node is operable to propagate a request from its corresponding requester towards the subtree. In addition, the leaf nodes are operable to propagate their priority assignment status (via signals variously known as "Head" (H) signals or "Flag" signals) towards the subtree for decision-making. Combinational logic circuitry distributively associated with the sub-tree's nodes is operable to hierarchically resolve the requests propagated by the leaf nodes all the way towards the root node, which generates a Grant signal that is cascaded through the subtree until a leaf node associated with the selected requester receives it. As pointed out above, each leaf node is coupled to either of its immediate neighbors via a directed ring, and the leaf node obtaining the grant is operable to transmit its grant to one of the neighboring leaf nodes in order to set its priority logic (i.e., the neighbor node's logic) for the next arbitration cycle.

Those skilled in the art will readily recognize that where Base=2, the hierarchical decision tree becomes a binary decision tree with a directed ring as its leaf level. For purposes of illustration, exemplary embodiments of the present invention will be set forth in additional detail with reference to a PRRA's binary decision tree for N=8.

Figure 3:
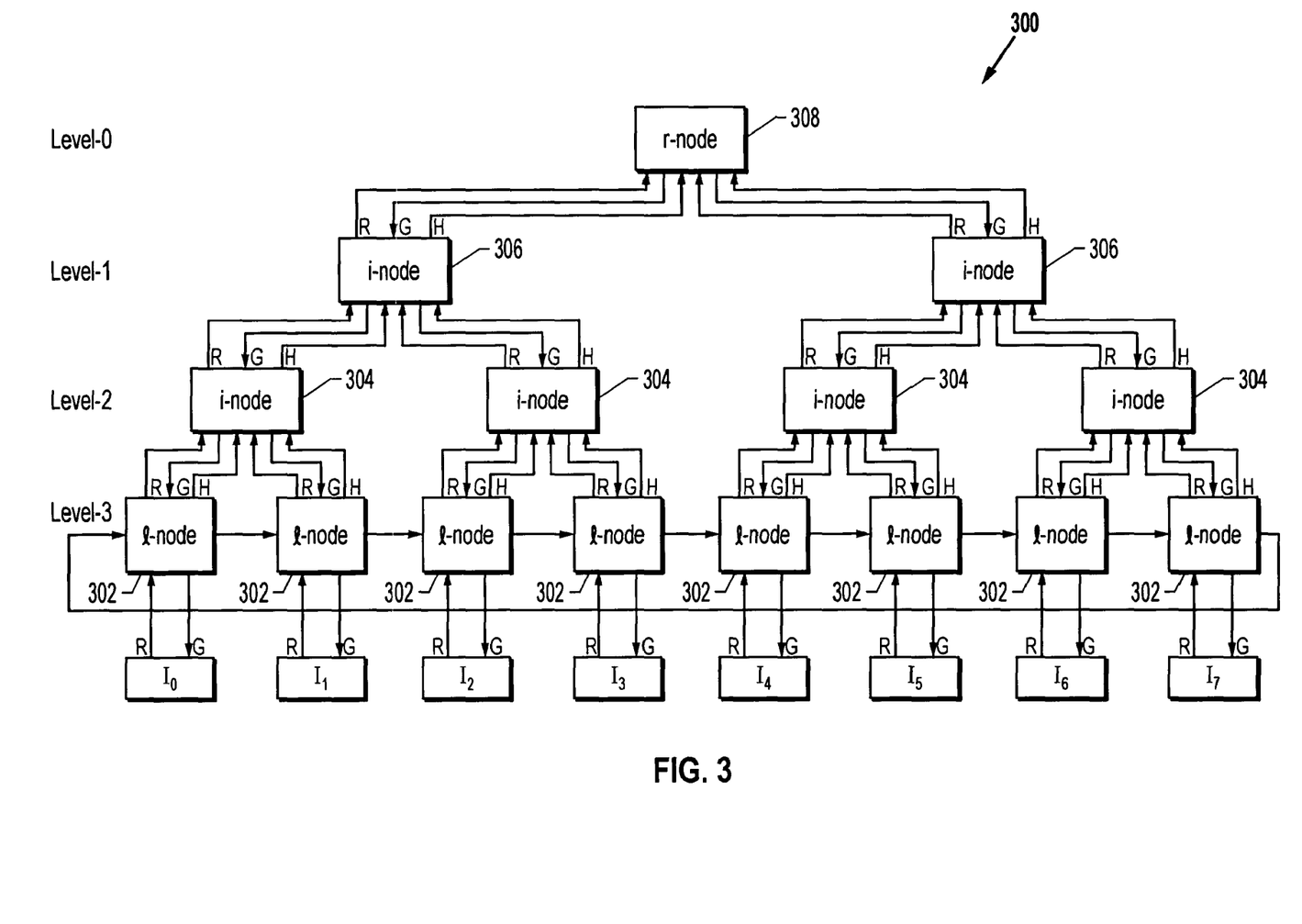
FIG. 3 depicts an embodiment of the PRRA of the present invention for arbitrating among eight requesters wherein a hierarchical decision tree is employed.

FIG. 3 depicts a PRRA embodiment 300 of the present invention for arbitrating among eight requesters ($I_0$-$I_7$) wherein a hierarchical decision tree is employed. The structure of the decision tree circuit is shown as a complete binary tree with K=[(log$_{Base}$N)+1]=[(log$_2$8)+1]=4 levels, level-0 through level-3. Reference numeral 302 refers to each of eight leaf nodes (l-nodes) that are linked together in a level-3 directed ring having a clockwise direction. Reference numerals 304 refers to internal nodes on level-2 (in general, the [(log$_2$N)]th level, i.e., level-[(log$_2$N)-1]), each being a parent node for two leaf nodes, i.e., a left leaf node and a corresponding right leaf node, wherein each leaf node 302 is operable to propagate a Request signal and a Head signal to its parent node. In turn, upon resolution of the Request signals, a Grant signal is directed from a level-2 parent node to one of its children, i.e., its leaf nodes. Reference numeral 306 refers to internal nodes on level-1 (in general, nodes belonging to level-1 through level-[(log$_2$N)-2]), each of which operates as a parent node to a pair of level-2 nodes with respect to their R and H signals, respectively, and propagates a Grant signal to its level-2 children upon resolution of the Request signals by a root node 308.

Figure 4:
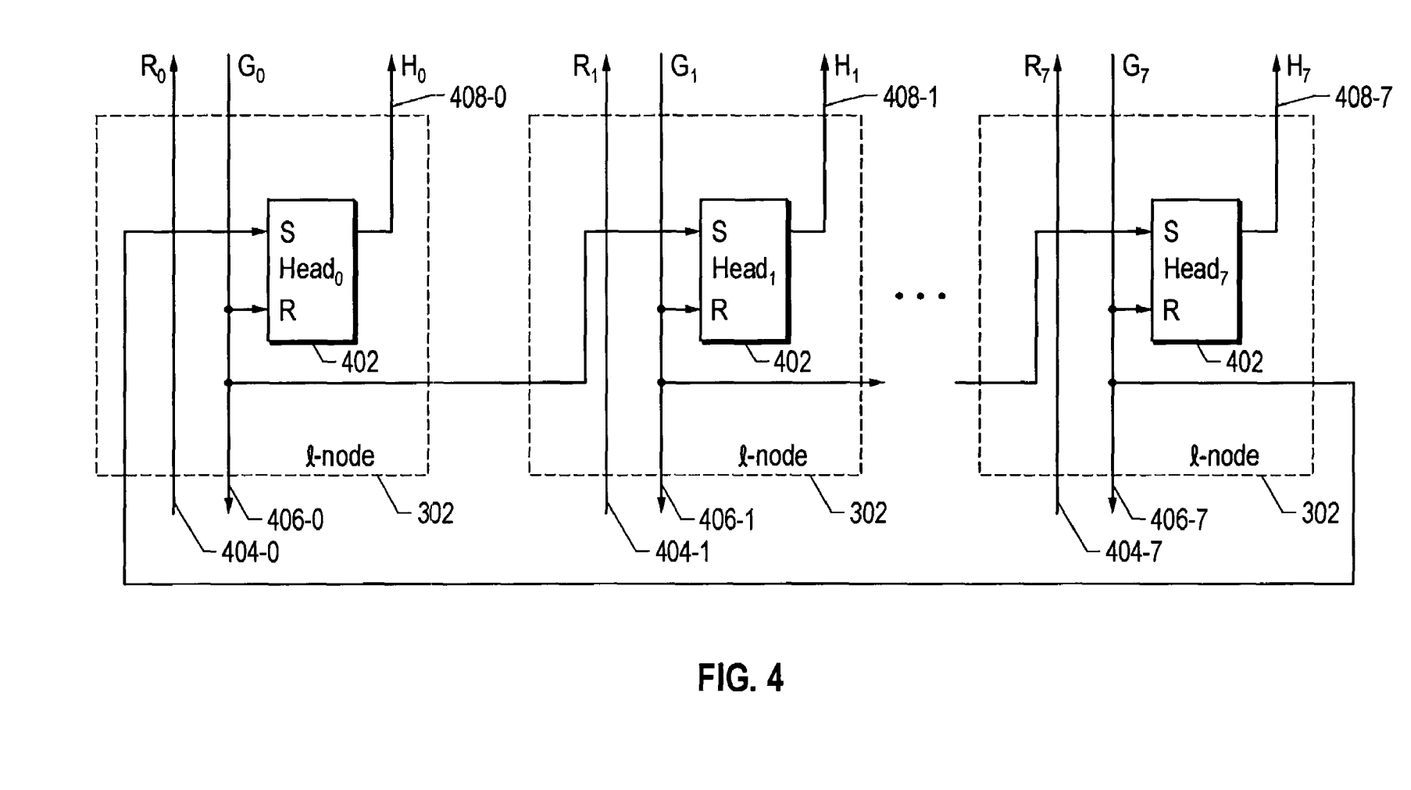
FIG. 4 depicts an exemplary embodiment of a plurality of leaf nodes of the hierarchical decision tree of FIG. 3.

FIG. 4 depicts an exemplary embodiment of the leaf nodes 302 of the hierarchical decision tree of FIG. 3. Each l-node includes a Reset-Set (RS) flip-flop (FF) operable to hold the logic state of the node's Head signal. Input requests 404-0 through 404-7, i.e., $R_0$ through $R_7$ (where $R_i$ indicates a request from requester i, i=0, 1, ... , 7), are propagated through the leaf nodes for resolution by the binary decision tree 300. The priority signals $H_i$ are generated by the FF elements 402, wherein being 1 indicates that a linear priority scheme of $I_i$, $I_{(i+1)\bmod N}$, ... , $I_{(i+N-1)\bmod N}$ (N=8) is implemented in the exemplary embodiment, with the $I_i$ having the highest priority to be connected to the common resource.

At any arbitration cycle, one and only one $H_i$ can be in the 1-state (assuming that initially $H_0$ is set to 1). If $H_k$ is currently in the 1-state (i.e., $H_k$=1), and if any $I_r$ is granted connection, $H_{(r+1)\bmod N}$ is set to 1 and $H_k$ is reset to 0. Otherwise, $H_k$ remains equal to 1. As can be seen in FIG. 4, such a rotating assignment is enforced by the Grant signals, i.e., $G_0$ through $G_7$ (reference numerals 406-0 through 406-7), each of which is connected to the Reset port of its corresponding FF 402 and the Set port of the next neighbor's FF.

When an input, e.g., $I_k$, requests to connect to the common resource, the Request signal $R_k$ associated with its leaf node, will be set to 1. These Request signals $R_i$ and the Head signals ($H_i$) are used by the hierarchical decision tree to determine which l-node will be selected. Suppose that currently $H_k$=1. Then, the following two cases arise.

Case I: For some i, $R_i=1$. In this case, the arbiter decision tree arbiter returns the following:

$$G_{[(k+a) \bmod N]}=1, \text{ where}$$

$$a=\min \{b | R_{[(k+b) \bmod N]}=1, 0 \leq b \leq (N-1)\} \quad (1)$$

and $$G_c=0 \text{ for } c \neq a \quad (2)$$

The "mod N" term in Equation (1) specifies that the arbiter will search the leaf nodes in a cyclic fashion, starting at the node denoted by k. The following FF elements in the directed ring (i.e., the leaf nodes' state logic) will be affected as a result of this arbitration result:

$$\text{Head}_k \leftarrow 0, \text{Head}_{[(k+a+1) \bmod N]} \leftarrow 1 \quad (3)$$

Further, as a result of this arbitration, $\text{Grant}_{[(k+a) \bmod N]}$ is sent to $I_{[(k+a) \bmod N]}$ and, accordingly, the appropriate switching element is operable to establish the connection pathway from the wining requester to the resource.

Case II: In this case, $R_i=0$ for $0 \leq i \leq (N-1)$. Here the decision tree arbiter returns $G_i=0$ for $0 \leq i \leq (N-1)$. No l-node is selected because there have been no requests. Accordingly, all Head signal FF elements in l-nodes remain unchanged. In particular, $H_k$ remains to be in 1-state.

Figure 5:
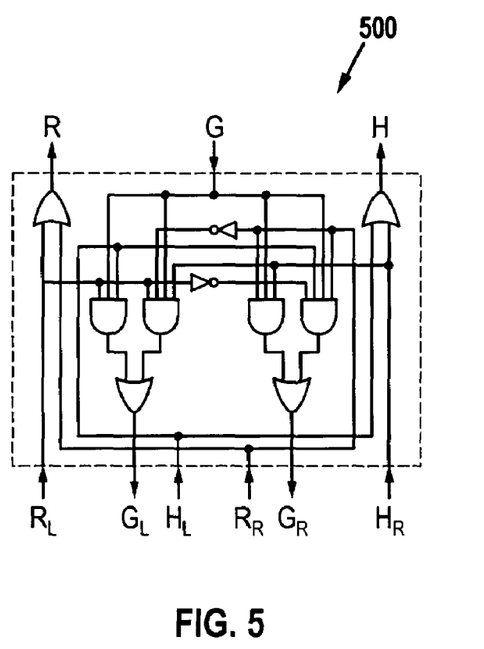
FIG. 5 depicts an exemplary embodiment of an internal node disposed on an intermediate level of the hierarchical decision tree shown in FIG. 3.

Referring now to FIG. 5, depicted therein is an exemplary embodiment of an internal node (i-node) disposed on an intermediate level of the hierarchical decision tree shown in FIG. 3. As illustrated, the exemplary i-node 500 is comprised of a combinational circuit that has four inputs from the child nodes: two from each of the i-node's child nodes—$R_L$ and $H_L$ from its left child, and $R_R$ and $H_R$ from its right child, which children may be leaf nodes in the case of an i-node on level-$[\log_2 (N)-1]$.

The combinational circuit 500 may comprise any combination of logic gates, e.g., AND gates, OR gates, NAND gates, NOR gates, XOR gates, inverters, and the like, which generates two outputs, R and H, to its parent node, i.e, the i-node's parent node. If the i-node is the left child of its parent node, then the R and H outputs may be designated as $R_L$ and $H_L$, respectively. Likewise, the R and H outputs of the i-node may be designated as $R_R$ and $H_R$ where the i-node is the right child of its parent node.

Analogously, where a pair of l-nodes are the child nodes to an i-node, the R and H outputs of a left leaf node will be the $R_L$ and $H_L$ inputs of the i-node. Likewise, the R and H outputs of a right leaf node will operate as the parent i-node's $R_R$ and $H_R$ inputs. Further, in the opposite signal direction, an i-node has one input, G, from its parent node. Once again, based on the convention set forth herein, if this i-node is the left (respectively, right) child node of its parent node, the G input will be the $G_L$ (or, $G_R$, respectively) output of the parent node. Additionally, the i-node's logic is operable to generate two Grant outputs, $G_L$ or $G_R$, which in turn are the G input of its left and right child node, respectively.

Regardless of its actual hardware implementation, the combinational circuit embodiment of the i-node 500 is operable to effectuate the I/O functionality dictated by following Boolean expressions:

$$R = R_L \cup R_R \quad (4)$$

$$H = H_L \cup H_R \quad (5)$$

$$G_L = \{G \cap R_L \cap H_L\} \cup \{G \cap R_L \cap H_R \cap !R_R\} \quad (6)$$

$$G_R = \{G \cap R_R \cap H_R\} \cup \{G \cap R_R \cap H_L \cap !R_L\} \quad (7)$$

Figure 6:
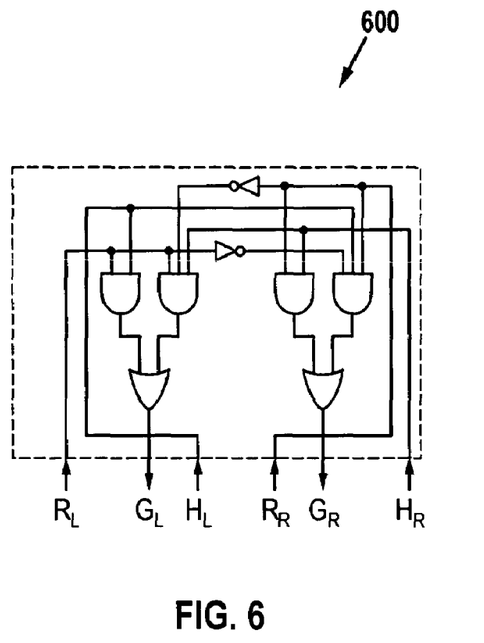
FIG. 6 depicts an exemplary embodiment of a root node disposed at the apex of the hierarchical decision tree shown in FIG. 3.

FIG. 6 depicts an exemplary embodiment of a root node (r-node) disposed at the apex of the hierarchical decision tree shown in FIG. 3. As illustrated, the r-node 600 is also provided as a combinational circuit that may be implemented using any logic gate circuitry and, in particular, the r-node circuitry is provided as a subcircuit of the i-node circuitry described above.

As the apex node of the decision tree arbiter, the r-node receives four inputs, two from each of its two child nodes disposed on level-1 (e.g., level-1 nodes 306): $R_L$ and $H_L$ from its left child and $R_R$ and $H_R$ from its right child. The logic circuitry of the r-node 600 is operable to provide two outputs responsive to these four inputs: $G_L$ and $G_R$, which in turn form the G input of its left and right child node, respectively. Again, regardless of the actual hardware implementation, the r-node's circuitry is operable to perform the I/O functionality specified by the following Boolean logic:

$$G_L = \{R_L \cap H_L\} \cup \{R_L \cap H_R \cap !R_R\} \quad (8)$$

$$G_R = \{R_R \cap H_R\} \cup \{R_R \cap H_L \cap !R_L\} \quad (9)$$

Those skilled in the art should appreciate that the functionality of a PRRA employing the binary decision tree of the type described above can be understood by examining the Boolean logic equations provided in the foregoing discussion. For instance, in accordance with Equations (4) and (5), the R output of an i-node u is 1 if and only if at least one of l-nodes in the subtree portion rooted at u has a request. Similarly, the H output of an i-node u is 1 if and only if there exists at least one leaf node belonging to the subtree portion rooted at u whose H value is 1. It should further be noted that only one of the two H signals (i.e., $H_L$ and $H_R$) can be 1, since at any time exactly one l-node can have its Head FF in the 1-state.

With respect to the Grant signaling of the PRRA's internal nodes, several combinations are possible by virtue of Equations (6) and (7). Thus, an i-node on level L includes combinational circuitry operable to output a Grant signal directed to its left child node on (L+1) level if either of the two following sets of conditions is satisfied. Condition set A requires that: (i) there is a Grant signal from the i-node's parent node on level (L−1); (ii) there was a Request signal from the left child node to the i-node; and (iii) there was a Head signal from the left child node to the i-node. Condition set B requires that: (i) there is a Grant signal from the i-node's parent node on level (L−1); (ii) there was a Request signal from the left child node to the i-node; (iii) there was a Head signal from a right child node to the i-node; and (iv) there was no Request signal from the right child node to the i-node.

Likewise, the following sets of conditions are possible with respect to a Grant signal generated by an i-node on level L towards its right child node: set A which requires that (i) there is a Grant signal from the i-node's parent node on level (L−1); (ii) there was a Request signal from the right child node to the i-node; and (iii) there was a Head signal from the right child node to the i-node, and set B which requires that: (i) there is a Grant signal from the i-node's parent node on level (L−1); (ii) there was a Request signal from the right child node to the i-node; (iii) there was a Head signal from a left child node to the i-node; and (iv) there was no Request signal from the left child node to the i-node.

In similar fashion, the Grant functionality of the r-node can be described by examining Equations (8) and (9) set forth above. There are two possibilities under which the r-node may issue a Grant to its left child node on level 1. In one situation, the combinational circuitry of the r-node is operable to output a Grant signal to its left child node if the following conditions are satisfied: (i) there was a Request signal from the left child node to the r-node; and (ii) there was a Head signal from the left child node to the r-node. In other words, at least one of l-nodes in the left subtree portion has a request and the l-node with H=1 is in that left subtree portion. The other situation when the combinational circuitry of the r-node is operable to output a Grant signal to its left child node is when the following conditions are satisfied: (i) there was a Head signal from a right child node to the r-node, the right child node being the counterpart to the left child node; (ii) there was no Request signal from the right child node to r-node; and (iii) there was a Request signal from the left child node to r-node. In other words, the r-node can issue a Grant to its left child node when at least one of the l-nodes in the left subtree portion has a request, none of the l-nodes in the right subtree portion has a request and the l-node with H=1 is in the right subtree portion.

Analogously, there are two possibilities under which the r-node may issue a Grant to its right child node on level 1. In one possibility, the combinational circuitry of the r-node is operable to output a Grant signal to its right child node if the following conditions are satisfied: (i) there was a Request signal from the right child node to the r-node; and (ii) there was a Head signal from the right child node to the r-node. To put it differently, the r-node may issue a Grant to its right child node when at least one of the l-nodes in the right subtree portion has a request and the l-node with H=1 is in that right subtree portion. The other possibility when the combinational circuitry of the r-node is operable to output a Grant signal to its right child node is when: (i) there was a Head signal from a left child node to the r-node, the left child node being the counterpart to the right child node; (ii) there was no Request signal from the left child node to r-node; and (iii) there was a Request signal from the right child node to r-node. In other words, the r-node may also issue a Grant to its right child node when at least one of the right subtree portions has a request, none of the l-nodes in the left subtree portion has a request and the l-node with H=1 belongs to the left subtree portion.

Based on the foregoing discussion, it can be readily seen that if $R_L=0$ and $R_R=0$, then $G_L=0$ and $G_R=0$ with respect to the r-node. Since $H_L$ and $H_R$ are mutually exclusive, at most one of the two G signals will be 1 (i.e., $G_L=1$ or $G_R=1$). Applying Equations (6) and (7) to the i-nodes of the decision tree all the way towards the leaf nodes, one can readily verify that the arbiter returns G values to l-nodes as specified in Equations (1) and (2). Further, by examining the RS flip-flops, it can be seen that Equation (3) is also verified.

Figure 7:
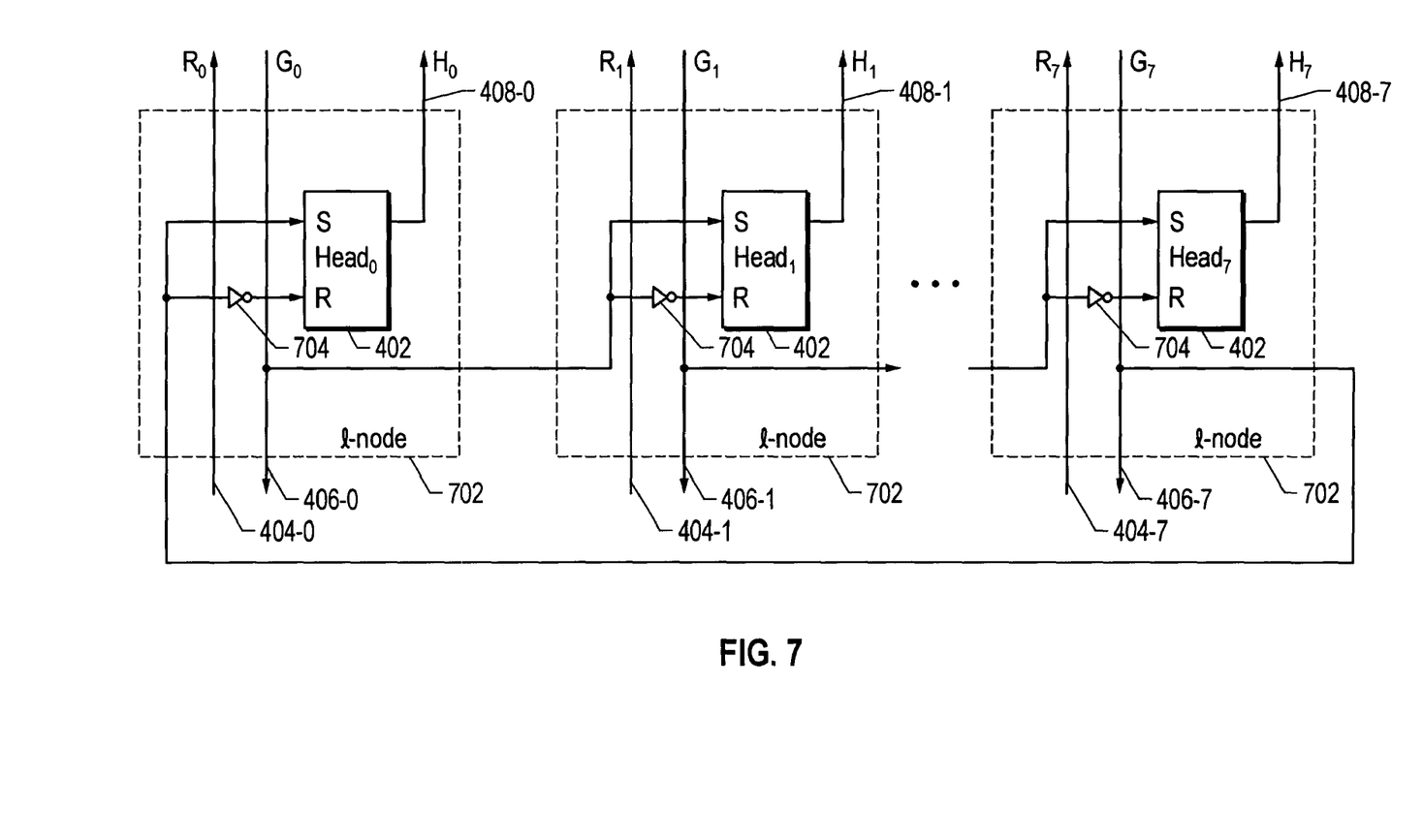
FIG. 7 depicts another exemplary embodiment of a plurality of leaf nodes of the hierarchical decision tree of FIG. 3.

FIG. 7 depicts another exemplary embodiment of a plurality of leaf nodes of the hierarchical decision tree of FIG. 3. Those skilled in the art should readily recognize upon reference hereto that the l-nodes 702 are essentially similar to the l-nodes 302 described in detail hereinabove. Accordingly, only certain salient features of the l-nodes 702 and the corresponding decision tree logic implementation of a PRRA will be described below.

As before, the l-nodes 702 are coupled together to form a directed ring that is operable to propagate requests generated by the requesters coupled thereto for hierarchical arbitration by the PRRA's decision tree. Also, each l-node 702 includes FF 402 for maintaining the priority assignment/status with respect to its Head flag. The Reset input of each l-node's FF is driven by an inverter 704 coupled to the Grant signal issued to the previous l-node. Further, the same Grant signal drives the Set input of the neighboring l-node's FF. That is, in other words, when an l-node 702 is issued a Grant signal in an arbitration cycle, the Grant signal does not reset its own FF, rather it and its complement respectively drive the S and R ports of the Head flag FF of the next neighbor in the directed ring (going in the clockwise direction). Regardless of these implementational variations, those skilled in the art will recognize that the logic governing issuance of a Grant signal and the corresponding FF state transition functionality is still specified by Equations (1) and (2) described above. On the other hand, the combinational circuitry of the i-nodes as well as the r-node in this PRRA embodiment will be somewhat different in order to effectuate the I/O relationships appropriately as the control signals cascade back and forth through the decision tree. However, since the overall arbiter architecture remains unchanged, only the key features of the nodal circuitry in this embodiment are set forth below for the sake of brevity.

Figure 8A:
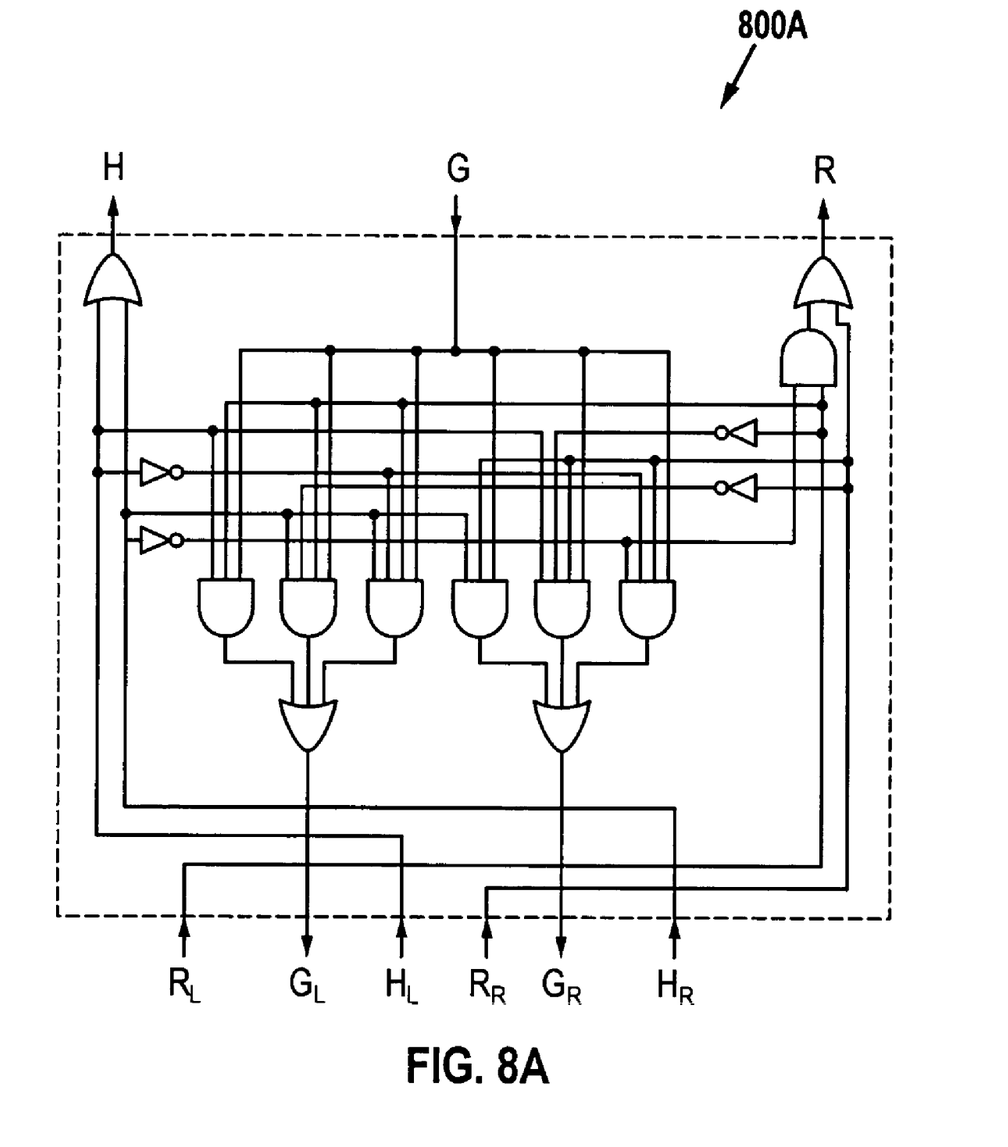
FIGS. 8A and 8B depict exemplary internal nodes disposed on two intermediate levels of the hierarchical decision tree shown in FIG. 3.
Figure 8B:
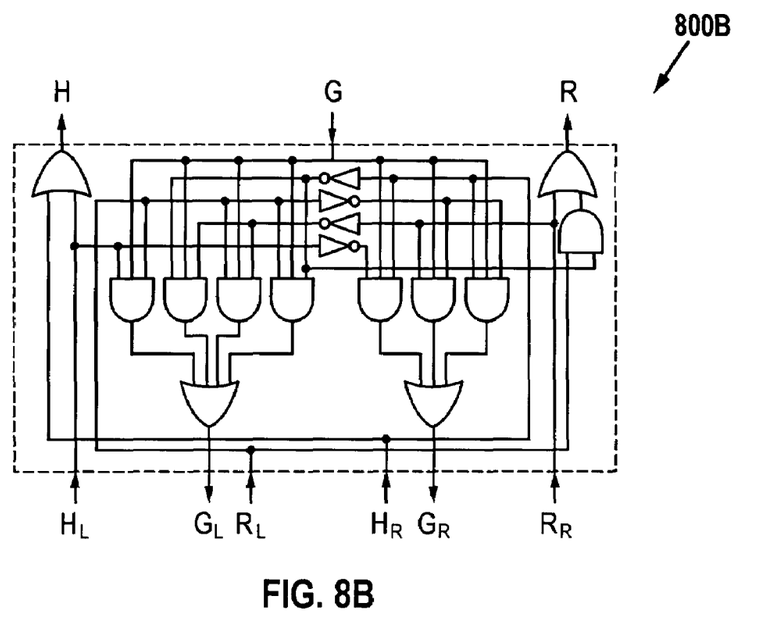

FIGS. 8A and 8B depict exemplary internal nodes disposed on two intermediate levels of the hierarchical decision tree shown in FIG. 3. More particularly, FIG. 8A depicts a Type-1 internal node 800A that is disposed on a level (i.e., level–[(log$_2$N)–1]) immediately next to the leaf node level. Accordingly, the Type-1 i-node 800A is operable as a parent node to receive the R and H inputs from its left leaf child node and right leaf child node, respectively, and generate the R and H outputs to its own parent node. The I/O relations of an i-node on this level are specified by the following Boolean functions:

$$R=[R_L \cap !H_R] \cup R_R \quad (10)$$

$$H=H_L \cup H_R \quad (11)$$

$$G_L=\{G \cap R_L\} \cap \{H_L \cup [H_R \cap !R_R] \cup [!H_R \cap !H_L]\} \quad (12)$$

$$G_R=\{G \cap R_R\} \cap \{H_R \cup [H_L \cap !R_L] \cup [!H_R \cap H_L \cap !R_L]\} \quad (13)$$

FIG. 8B depicts an internal node 800B that is representative of the internal nodes of a PRRA that are not Type-1 nodes, i.e., all those nodes on levels that are disposed between the root node level and the Type-1 node level, and that may be referred to as a Type-2 i-node. The I/O relations of a Type-2 i-node are governed by the following Boolean logic:

$$R=[R_L \cap !H_R] \cup R_R \quad (14)$$

$$H=H_L \cup H_R \quad (15)$$

$$G_L=G \cap \{[H_L \cap R_L] \cup [!H_R \cap !R_R] \cup [!R_R \cap R_L] \cup [R_L \cap !H_R]\} \quad (16)$$

$$G_R=G \cap \{[H_R \cap R_R] \cup [!R_L \cap !H_L] \cup [!H_L \cap R_R]\} \quad (17)$$

Figure 9:
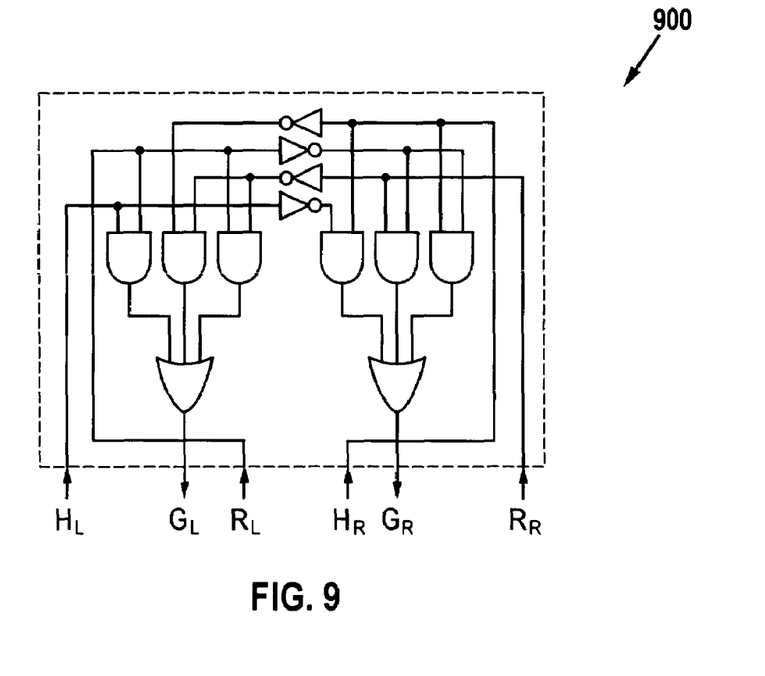
FIG. 9 depicts an another exemplary embodiment of a root node disposed at the apex of the hierarchical decision tree shown in FIG. 3.

FIG. 9 depicts an exemplary embodiment of a root node 900 operable with a hierarchical decision tree having the alternative embodiments of the leaf nodes and internal nodes (Type-1 and Type-2) described above. As seen before, essentially, the r-node 900 is operable responsive to the four inputs (one set of R and H signals from the r-node's left child node and another set of R and H signals from the r-node's right child node) in order to generate two G output signals. The I/O relations of the r-node 900 are specified by the following Boolean logic:

$$G_L=[H_L \cap R_L] \cup [!H_R \cap !R_R] \cup [!R_R \cap R_L] \quad (18)$$

$$G_R[H_R \cap R_R] \cup [!R_L \cap !H_L] \cup [!H_L \cap R_R] \quad (19)$$

Favorable results, in terms of timing and area cost, have been obtained by way of simulations of the aforesaid PRRA embodiments using commercially available field-programmable gate array (FPGA) circuitry. For purposes of illustration, the following Table I provides comparative performance of a conventional RRA (e.g., an RRA based on a programmable priority encoder (PPE) design) and the present invention's PRRA scheme, where arbitration times (in nanoseconds (nS)) and the number of logic cells (LCs) are set forth:

TABLE I

| Design | N = 8 | | N = 16 | | N = 32 | | N = 64 | |
|---|---|---|---|---|---|---|---|---|
| PPE-RRA | 13.8 | 41 | 17.5 | 137 | 30.0 | 676 | 39.9 | 2600 |
| PRRA | 15.3 | 34 | 17.4 | 76 | 19.9 | 172 | 25.5 | 318 |
| Parameter | nS | LCs | nS | LCs | nS | LCs | nS | LCs |

Based upon the foregoing Detailed Description, it should be appreciated that the PRRA scheme provided in accordance with the teachings of the present invention is advantageous in terms of faster arbitrations as well as fewer logic cells. Thus, in practice, any PRRA implementation of the present invention provides a simpler, faster and more cost-effective solution applicable in a variety of scenarios where multiple requesting entities necessitate arbitration. Additionally, in a further embodiment, the N RS flip-flops of a PRRA's leaf nodes may be replaced by other logic in order to render the priority assignment programmable.

It is believed that the operation and construction of the present invention will be apparent from the foregoing Detailed Description. While one or more of the exemplary embodiments of the invention shown and described have been characterized as being preferred, it should be readily understood that various changes and modifications could be made therein without departing from the scope of the present invention as set forth in the following claims.

What is claimed is:

1. A parallel round-robin arbiter (PRAA) for arbitrating among a plurality of requesters, comprising:
    a first plurality of leaf nodes coupled together in a directed ring, wherein at least one of the leaf nodes propagates a request from a corresponding one of the plurality of requesters, wherein said directed ring forms a leaf level in a hierarchical decision tree having $[(\log_{Base} N)+1]$ levels, where $N=[Base]^n$ for [[some]] $n>1$;
    a second plurality of nodes organized in a subtree having $[\log_{Base} N]$ levels of said hierarchical decision tree, wherein a root level includes a root node and a sub-plurality of intermediate levels each including $[Base]^i$ internal nodes, where $i=1, 2, \ldots, [(\log_{Base} N)-1]$; and
    logic associated with said subtree's nodes that hierarchically resolves requests propagated by said leaf nodes, wherein each of the leaf nodes transmits its grant to one of die leaf node's immediate neighbors coupled to it via said directed ring.

2. The parallel round-robin arbiter (PRAA) for arbitrating among the plurality of requesters as set forth in claim 1, wherein said Base is 3 and said hierarchical decision tree comprises a ternary tree.

3. The parallel round-robin arbiter (PRAA) for arbitrating among the plurality of requesters as set forth in claim 1, wherein said Base is 2 and said hierarchical decision tree comprises a binary tree.

4. The parallel round-robin arbiter (PRAA) for arbitrating among the plurality of requesters as set forth in claim 3, wherein said logic associated with at least one of the internal nodes on level L wherein L is a natural number which is greater than or equal to 0, includes combinational circuitry operable to output a Request signal directed to its parent node on (L−1) level only if at least one of the leaf nodes belonging to a subtree portion rooted at said internal node has a request.

5. The parallel round-robin arbiter (PRAA) for arbitrating among the plurality of requesters as set forth in claim 4, wherein said logic associated with at least one of the internal nodes on level L includes the combinational circuitry operable to output a Head signal indicative of a priority flag directed to its parent node on (L−1) level only if at least one leaf node belonging to a subtree portion rooted at said internal node propagates a signal indicative of said priority flag.

6. The parallel round-robin arbiter (PRAA) for arbitrating among the plurality of requesters as set forth in claim 5, wherein said logic associated with at least one of the internal nodes on level L includes the combinational circuitry operable to output a Grant signal directed to its left child node on (L+1) level if the following conditions are satisfied: (i) there is a Grant signal from said internal node's parent node on level (L−1); (ii) there was a Request signal from said left child node to said internal node; and (iii) there was a Head signal from said left child node to said internal node.

7. The parallel round-robin arbiter (PRAA) for arbitrating among the plurality of requesters as set forth in claim 5, wherein said logic associated with at least one of the internal nodes on level L includes the combinational circuitry operable to output a Grant signal directed to its left child node on (L+1) level if the following conditions are satisfied: (i) there is a Grant signal from said internal node's parent node on level (L−1); (ii) there was a Request signal from said left child node to said internal node; (iii) there was a Head signal from a right child node to said internal node, said right child node corresponding to said left child; and (iv) there was no Request signal from said right child node to said internal node.

8. The parallel round-robin arbiter (PRAA) for arbitrating among the plurality of requesters as set forth in claim 5, wherein said logic associated with at least one of the internal nodes on level L includes the combinational circuitry operable to output a Grant signal directed to its right child node on (L+1) level if the following conditions are satisfied: (i) there is a Grant signal from said internal node's parent node on level (L−1); (ii) there was a Request signal from said right child node to said internal node; and (iii) there was a Head signal from said right child node to said internal node.

9. The parallel round-robin arbiter (PRAA) for arbitrating among the plurality of requesters as set forth in claim 5, wherein said logic associated with at least one of the internal nodes on level L includes the combinational circuitry operable to output a Grant signal directed to its right child node on (L+1) level if the following conditions are satisfied: (i) there is a Grant signal from said internal node's parent node on level (L−1); (ii) there was a Request signal from said right child node to said internal node; (iii) there was a Head signal from a left child node to said internal node, said left child node corresponding to said right child node; and (iv) there was no Request signal from said left child node to said internal node.

10. The parallel round-robin arbiter (PRAA) for arbitrating among the plurality of requesters as set forth in claim 5, wherein said logic includes the combinational circuitry associated with said root node on level 0, said combinational circuitry operating to output a Grant signal directed to its left child node on level 1 if the following conditions are satisfied: (i) there was a Request signal from said left child node to said root node; and (ii) there was a Head signal from said left child node to said root node.

11. The parallel round-robin arbiter (PRAA) for arbitrating among the plurality of requesters as set forth in claim 5, wherein said logic includes the combinational circuitry associated with said root node on level 0, said combinational circuitry operating to output a Grant signal directed to its left child node on level 1 if the following conditions are satisfied: (i) there was a Head signal from a right child node to said root node, said right child node corresponding to said left child node; (ii) there was no Request signal from said right child node to said root node; and (iii) there was a Request signal from said left child node to said root node.

12. The parallel round-robin arbiter (PRAA) for arbitrating among the plurality of requesters as set forth in claim 5, wherein said logic includes the combinational circuitry associated with said root node on level 0, said combinational circuitry operating to output a Grant signal directed to its right child node on level 1 if the following conditions are satisfied: (i) there was a Request signal from said right child node to said root node; and (ii) there was a Head signal from said right child node to said root node.

13. The parallel round-robin arbiter (PRAA) for arbitrating among the plurality of requesters as set forth in claim 5, wherein said logic includes the combinational circuitry associated with said root node on level 0, said combinational circuitry operating to output a Grant signal directed to its right child node on level 1 if the following conditions are satisfied: (i) there was a Head signal from a left child node to said root node, said left child node corresponding to said right child node; (ii) there was no Request signal from said left child node to said root node; and (iii) there was a Request signal from said right child node to said root node.

14. A crossbar switch apparatus for switching a plurality (N) of input queues to at least one output, comprising:
at least one of a first plurality of leaf nodes for receiving requests generated by said plurality of input queues; and
at least one of a second plurality of leaf nodes including logic for hierarchically resolving which input queue's request with respect to said at least one output should be granted,
wherein said at least one of a first plurality of leaf nodes includes a plurality of leaf nodes that correspond to said plurality of input queues, each leaf node including said logic for influencing its neighboring leaf node's state if said leaf node receives a Grant signal responsive to a request generated by a corresponding input queue, wherein said logic:
is associated with at least one internal node on a level L; and
includes combinational circuitry operable to output:
a Request signal directed to a parent node on a (L−1) level only if at least one of the leaf nodes belonging to said second plurality of leaf nodes rooted at said internal node has a request; and
a Head signal indicative of a priority flag directed to said parent node on said (L−1) level only if at least one of the leaf nodes belonging to said second plurality of leaf nodes rooted at said internal node propagates a signal indicative of said priority flag.

15. The crossbar switch apparatus for switching a plurality of input queues to at least one output as set forth in claim 14, wherein said logic for hierarchically resolving which input queue's request with respect to said at least one output should be granted comprises a decision tree with said plurality of leaf nodes forming a leaf level.

16. The crossbar switch apparatus for switching a plurality of input queues to at least one output as set forth in claim 15, wherein said decision tee comprises $[\log_{Base} N]$ levels, where $N=[Base]^n$ for $n>1$.

17. The crossbar switch apparatus for switching a plurality of input queues to at least one output as set forth in claim 16, wherein said Base is 3 and said decision tree comprises a ternary tree.

18. The crossbar switch apparatus for switching a plurality of input queues to at least one output as set forth in claim 16, wherein said Base is 2 and said decision tree comprises a binary tree.

19. The crossbar switch apparatus for switching a plurality of input queues to at least one output as set forth in claim 18, wherein each of said plurality of leaf nodes includes a Reset-Set flip-flop element whose state is controlled by a Grant signal issued to a neighboring leaf node.

20. An arbitration method for resolving contention among a plurality of requesting entities (N requesters) with respect to at least one common resource, comprising:
receiving requests generated by said plurality of requesters, said requests being propagated by a plurality of leaf nodes corresponding to said plurality of requesters, wherein each leaf node transmits a control signal indicative of its priority status;
hierarchically resolving which requester's request with respect to said at least one common resource should be granted; and
generating, by a leaf node that receives a Grant signal, a control signal for transmission to its neighboring leaf node for affecting said neighboring leaf node's priority status, the leaf node including logic that:
is associated with at least one internal node on a level L; and includes combinational circuitry operable to output:
a Request signal directed to a parent node on a (L−1) level only if at least one of the leaf nodes belonging to said second plurality of leaf nodes rooted at said internal node has a request; and
a Head signal indicative of a priority flag directed to said parent node on said (L−1) level only if at least one of the leaf nodes belonging to said second plurality of leaf nodes rooted at said internal node propagates a signal indicative of said priority flag.

21. The arbitration method for resolving contention among a plurality of requesting entities as set forth in claim 20, wherein said operation of hierarchically resolving which requester's request with respect to said at least one common resource should be granted is effectuated by a decision tree having a plurality of levels such that said plurality of leaf nodes form a leaf level.

22. The arbitration method for resolving contention among a plurality of requesting entities as set forth in claim 21, wherein said decision tree comprises a binary tree.

23. The arbitration method for resolving contention among a plurality of requesting entities as set forth in claim 21, wherein said plurality of leaf nodes are coupled together in a directed ring.

24. The arbitration method for resolving contention among a plurality of requesting entities as set forth in claim 21, wherein said decision tree comprises a ternary tree.

* * * * *